United States Patent
Flores Tapia (10) Patent No.: US 12,481,061 B2
(45) Date of Patent: Nov. 25, 2025

(54) FREQUENCY MODULATED CONTINUOUS WAVE (FMCW) WAVEFORM GENERATOR/DECODER

(71) Applicant: GM Cruise Holdings LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1014 days.

(21) Appl. No.: 17/553,586

(22) Filed: Dec. 16, 2021

(65) Prior Publication Data

US 2023/0194713 A1   Jun. 22, 2023

(51) Int. Cl.
    *G01C 3/08*      (2006.01)
    *G01S 17/34*      (2020.01)
    *G01S 17/86*      (2020.01)

(52) U.S. Cl.
    CPC ............ *G01S 17/34* (2020.01); *G01S 17/86* (2020.01)

(58) Field of Classification Search
    CPC ................. G01S 17/34; G01S 17/86
    See application file for complete search history.

(56) References Cited

U.S. PATENT DOCUMENTS

| | | | |
|---|---|---|---|
| 10,845,474 B1 * | 11/2020 | Riley | G01S 15/931 |
| 2019/0293749 A1 | 9/2019 | Itkin et al. | |
| 2020/0400821 A1 * | 12/2020 | Baker | G01S 7/4804 |
| 2022/0291389 A1 * | 9/2022 | Tachwali | G01S 7/487 |

FOREIGN PATENT DOCUMENTS

| | | | | |
|---|---|---|---|---|
| CN | 109975823 A | * | 7/2019 | ............ G01S 7/484 |
| CN | 110927734 A | * | 3/2020 | ............ G01S 7/483 |
| EP | 1096269 A2 | | 2/2001 | |

OTHER PUBLICATIONS

European Search Report dated Apr. 28, 2023; Application No. 22207852.9.

* cited by examiner

*Primary Examiner* — Mark Hellner
(74) *Attorney, Agent, or Firm* — CANTOR COLBURN LLP (57) ABSTRACT

The present disclosure is directed to the transmission and reception of sets of very high frequency electromagnetic (EM) signals in ways that allow a sensing apparatus to discriminate between different sets of transmitted EM signals. Here a sensing apparatus may sequentially transmit different sets of EM signals. Each of these different sets of signals may include an encoded identifier that uniquely identifies each respective signal set of the different sets of signals. Each of these signal sets may include several pulses of a particular frequency with a same relative phase relationship followed by pulses that have a different phase relationship. These changes in phase may be used to encode the unique identifiers into the different sets of transmitted EM energy and these identifiers may be used by a sensing apparatus to associate specific received sets of EM energy with specific sets of transmitted EM energy.

19 Claims, 6 Drawing Sheets

FREQUENCY MODULATED CONTINUOUS WAVE (FMCW) WAVEFORM GENERATOR/DECODER

BACKGROUND

1. Technical Field

The present disclosure is generally related to improving apparatus that allows a controller of an autonomous vehicle to identify objects located in the vicinity of an autonomous vehicle. More specifically, the present disclosure is directed to methods and apparatus that allow a vehicle controller to associate particular sets of received electromagnetic energy with particular sets of transmitted electromagnetic energy.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

SUMMARY

The present disclosure is directed to systems, apparatuses, methods, computer readable medium, and circuits that may prepare, transmit, receive, and process sets of electromagnetic energy. A method of the present disclosure may include transmitting pulses of a first burst of electromagnetic energy from a sensing apparatus. These pulses of the first burst of electromagnetic energy may include a first identifier encoded into and associated with the pulses of the first burst of electromagnetic energy. This method may also include the steps of receiving pulses of a first set of electromagnetic energy at the sensing apparatus based on the pulses of the first burst of electromagnetic energy being reflected off of an object at a location and identifying that the pulses of the first set of electromagnetic energy are associated with the pulses of the first burst of electromagnetic energy based on the pulses first set of electromagnetic energy including the encoded first identifier. The presently claimed method may then process the pulses of first set of electromagnetic energy in association with the pulses of the first burst of transmitted electromagnetic energy to identify the location of the object.

An apparatus consistent with the present disclosure may include a transmitting element that transmits pulses of a first burst of electromagnetic energy from the apparatus, the pulses of the first burst of electromagnetic energy may include a first identifier encoded into and associated with the pulses of the first burst of electromagnetic energy. This apparatus may also include a receiving element that receives pulses of a first set of electromagnetic energy at the apparatus based on the pulses of the first burst of electromagnetic energy being reflected off of an object at a location. Electronic circuits of this apparatus may be used to identify that that the pulses of the first set of electromagnetic energy are associated with the pulses of the first burst of electromagnetic energy based on the pulses first set of electromagnetic energy including the encoded first identifier. The presently claimed apparatus may also include a memory and a processor that executes instructions out of a memory to identify the location of the object.

When the presently claimed method is performed by a non-transitory computer-readable storage medium, a processor executing instructions out of a memory may control the transmission of pulses of a first burst of electromagnetic energy from a transmitting element, the pulses of the first burst of electromagnetic energy may include a first identifier encoded into and associated with the pulses of the first burst of electromagnetic energy. Pulses of a first set of electromagnetic energy may then be received at a receiving element based on the pulses of the first burst of electromagnetic energy being reflected off of an object at a location, and an identification may be performed indicating that the pulses of the first set of electromagnetic energy are associated with the pulses of the first burst of electromagnetic energy based on the pulses first set of electromagnetic energy including the encoded first identifier. The processor may then execute additional instructions out of the memory to process data associated with the first set of electromagnetic energy in association with the pulses of the first burst of transmitted electromagnetic energy to identify the location of the object.

DETAILED DESCRIPTION

The present disclosure is directed to the transmission and reception of sets of very high frequency electromagnetic (EM) signals in ways that allow a sensing apparatus to discriminate between different sets of transmitted EM signals. Here a sensing apparatus may be a radar or LiDAR apparatus that sequentially transmits different sets of EM signals. Each of these different sets of signals may include an encoded identifier that uniquely identifies each respective signal set of the different sets of signals. Each of these signal sets may include several pulses of a particular frequency with a same relative phase relationship followed by pulses that have a different phase relationship. These changes in phase may be used to encode the unique identifiers into the different sets of transmitted EM energy and these identifiers may be used by a sensing apparatus to associate specific received sets of EM energy with specific sets of transmitted EM energy.

Frequency modulated continuous wave (FMCW) radar and LiDAR sensors are used to sense velocity of objects around a vehicle. Such apparatus detects objects in the vicinity of the vehicle by transmitting emitted electromagnetic energy (EM). After that, transmitted EM energy bounces (reflects) off an object back toward the apparatus, a sensor at the apparatus senses the reflected EM energy. Characteristics of the reflected EM energy allow a sensing apparatus to identify where the object is located and may also be used to detect a speed of the object.

In certain instances, EM energy may be reflected off numerous objects, and the sensing apparatus may receive more than one set of reflected EM energy from the same set of transmitted EM energy. This is similar to an echo of a person's voice in a canyon. This happens because a portion of the transmitted EM energy or the person's voice may be reflected off more than one object before that portion of electromagnetic energy is received back at the sensing apparatus or the person's ears. This means that a sensing apparatus may receive both primary reflections of EM energy and may receive secondary reelections (i.e., echoes) of the transmitted EM energy. These echoes may result in the sensing apparatus misinterpreting a distance or velocity to associate with an object. This is because conventional sensing apparatus cannot discriminate between primary reflections of transmitted EM energy and echoes (secondary reflections) of that reflected electromagnetic energy.

In operation, a radar or LiDAR apparatus may transmit multiple sets of pulses of EM energy when attempting to detect objects that are in the vicinity of a vehicle. After a set of electromagnetic energy has been transmitted, that energy may impact an object and be directly reflected back to the sensing apparatus (e.g., a radar or LiDAR apparatus). Signals associated with the EM energy that is transmitted from a device and reflected off an object without impacting other objects are an example of a primary reflection of the electromagnetic energy.

As mentioned above, a portion of the transmitted electromagnetic energy may be reflected off more than one object before that portion of electromagnetic energy is received back at the sensing apparatus, resulting in echoes of EM energy being received at the sensing apparatus. The receipt of these echoes can result in an apparatus associating a set of received electromagnetic energy with an incorrect set of transmitted energy. This is because a given apparatus (e.g. a radar or LiDAR apparatus) transmits numerous sets of EM energy over time, and this may result in echoes of a first set of transmitted electromagnetic energy being received after a subsequent set (e.g. a second set or third set) of EM energy has been transmitted from the apparatus. These echoes of EM energy may result in a radar apparatus misinterpreting received data.

Figure 1:
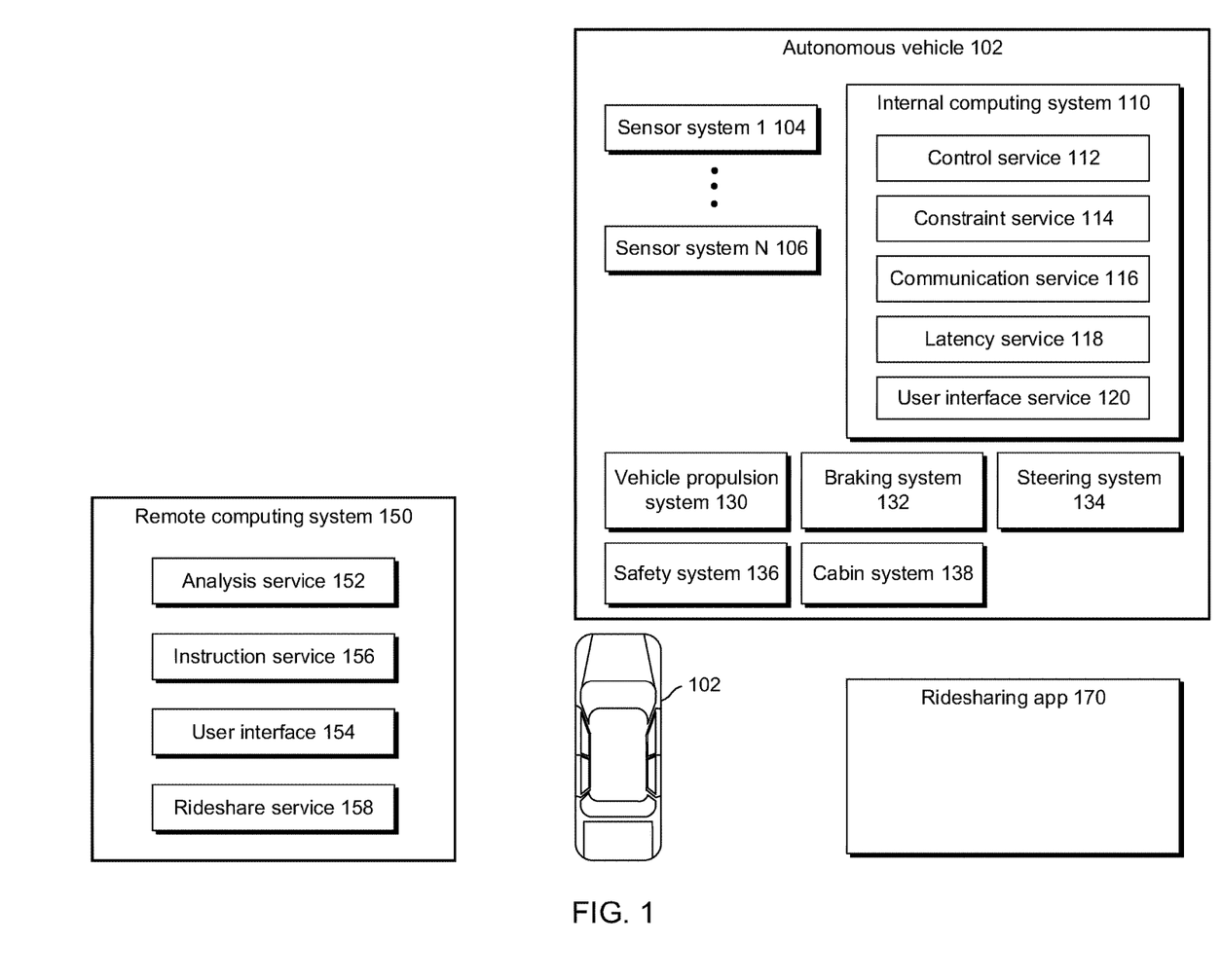
FIG. 1 illustrates environment 100 that includes an autonomous vehicle 102 in communication with a computing system 150.

FIG. 1 illustrates environment 100 that includes an autonomous vehicle 102 in communication with a computing system 150. The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 102 through an Nth sensor system 104). The sensor systems 104-106 are of different types and are arranged about the autonomous vehicle 102. For example, the first sensor system 104 may be a camera sensor system and the Nth sensor system 106 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally includes an internal computing system 110 that is in communication with the sensor systems 104-106 and the mechanical systems 130, 132, 134. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 106, the braking system 108, the steering system 110, the safety system 136, and the cabin system 138. The control service 112 receives sensor signals from the sensor systems 102-104 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remoting computing system or a human operator via the remote computing system 150, software service updates, ridesharing pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

Methods of the present disclosure may be implemented at an apparatus that transmits electromagnetic energy, receives reflected electromagnetic energy, and processes data associated with the received electromagnetic energy. Such an apparatus may transmit and receive signals in one or more different bands of the electromagnetic spectrum. For example, a radar apparatus may be any one of a set of different bands of electromagnetic energy that may include the Ku band (using signals ranging from 12.5 gigahertz (GHz) to 18 GHz), the K band (using signals ranging from 18 GHz to 26.5 GHz), the Ka band (using signals ranging from 26.5 GHz to 40 GHz), and or the millimeter band (using signals ranging from 40 GHz to 100 GHz). LiDAR may use frequencies of light at frequencies known not to cause injury to the eyes of persons or animals. For example, a LiDAR apparatus may transmit energy in the frequency range of about 200 terahertz (THz).

Figure 2:
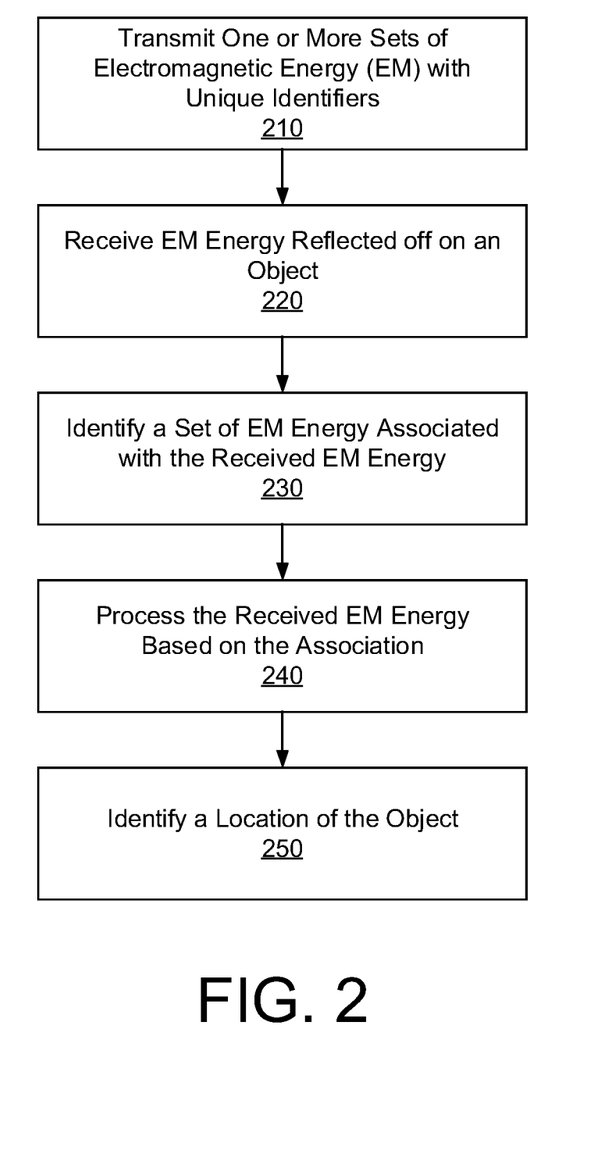
FIG. 2 illustrates an exemplary set of steps that may be performed when sets of electromagnetic energy are transmitted and received at an apparatus.

FIG. 2 illustrates an exemplary set of steps that may be performed when sets of electromagnetic energy are transmitted and received at an apparatus. FIG. 2 includes a first step 210 where electromagnetic (EM) energy is transmitted from a sensing apparatus. While not illustrated in FIG. 2 step 210 may include sets of steps that occur sequentially in time. Step 210 may include transmitting a first set of pulses that include a first identifier that may be unique to this first set of pulses. Step 210 may also include transmitting a second set of pulses that include a second identifier that may be unique to the second set of pulses. Step 210 may also include transmitting additional sets of pulses that each may include a unique identifier. Step 210 may, therefore, transmit one or more sets of EM energy that each include a unique identifier. These sets of transmitted EM signals may include a series of pulses that are transmitted as respective bursts of EM energy over time.

Generation of the first and the second set of pulses discussed above may be performed by electronic circuits that generate pulses of a selected frequency. For example, a voltage-controlled oscillator (VCO) may be set to a particular frequency by providing a voltage to an input of the VCO. This voltage may be controlled by a processor that selects a frequency based on a current operational mode of the sensing apparatus. To set this voltage, the processor may output a code to a digital to analog converter (ADC) and the ADC may provide the voltage to the VCO to set the operational frequency of the VCO. Unique identifiers may be generated by other electronic circuits that may be a chaotic reference signal generator or these identifiers may have been generated by a random number generator. Additional combinational logic may receive the pulses generated by the VCO and this combinational logic may be used to encode the identifier into a set of transmitted EM energy. This encoding may change the phase of the signal generated by the VCO and the identifier may be encoded into a signal that includes a base frequency of the VCO and changes in phase that correspond to the encoded identifier. The resulting signal may include encoded data as discussed in respect to FIG. 6 of the present disclosure. Identifiers from different sets of transmitted sets of EM energy may be stored, for example, in a register so they can be compared to identifiers extracted from sets of received EM energy.

T/o transmit a set of EM energy, the encoded signal discussed above may be transmitted as a set of transmitted EM energy by providing the signal to an amplifier and then to a radar antenna. Alternatively, the set of transmitted EM energy may be transmitted by providing the signal to a LiDAR transmitting circuit.

Next in step 220, EM energy reflected off an object may be received. The EM energy received in step 220 may be associated with a set of EM energy that was previously transmitted from the sensing apparatus. As such, the EM energy received in step 220 may include a set of pulses that include an identifier that, for example, is associated with the first set of EM energy transmitted from the sensing apparatus. This received EM energy may be received by a radar antenna of the sensing apparatus or this received EM energy may be received by a receiver capable of receiving energy in the LiDAR spectrum.

Since the speed at which EM signals travel is very fast (about 1 foot per nanosecond), primary reflections of the first set of transmitted radar pulses may likely be received well before the transmission of the second set of transmitted pulses. As discussed above, it is possible for subsequent reflections of these sets of EM signals (echoes) being received at the sensing apparatus after a second set of EM signals has been transmitted. Factors associated with the transmission and receipt of reflected EM signals relative to a set of transmitted EM signals will depend on the speed at which EM signals travel and the total distance that the EM signals travel between the transmission of the EM signals and the receipt of the reflected energy. A likelihood of receiving reflected EM signals of the first set of transmitted energy after the transmission of a second or subsequent sets of EM signals from the sensing apparatus may also correspond to a range ambiguity return, which basically denotes a response received outside its initial transmission window.

Figure 6:
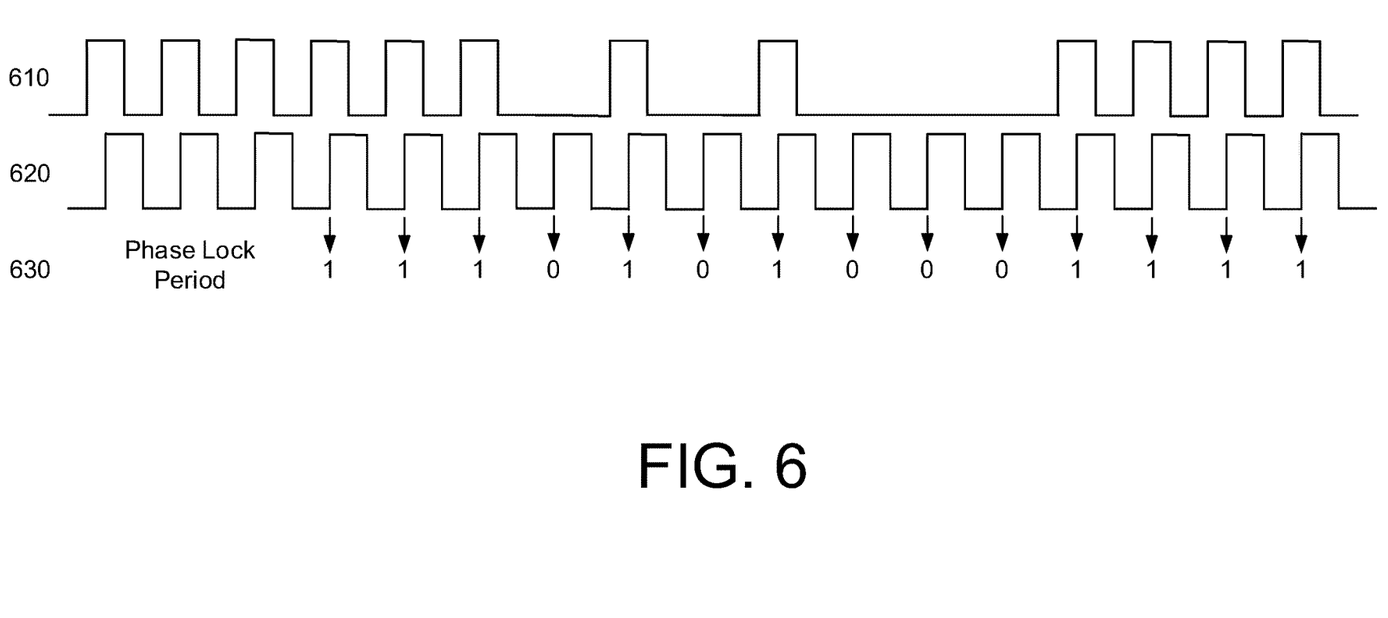
FIG. 6 illustrates a first waveform that includes encoded data, a second waveform that may act as a clock to decode data included in the first waveform, and data that has been decoded from the first waveform.

Next in step 230 the set of EM energy associated with the received EM energy may be identified. This may involve, extracting an identifier from the received EM energy and comparing that identifier to identifiers associated with previously transmitted sets of EM energy. The identifier may be extracted from the received EM energy by first synchronizing a voltage-controlled oscillator (VCO) of a phase locked loop to a first leading set of pulses in the received EM energy. Combinational logic may be used to decode the identifier from the received EM energy in a manner similar to the decoding discussed in respect to FIG. 6. FIG. 6 discusses how changes in phase of a signal may be used to decode logic ones and zeros from a signal. Once decoded from the signal of the received EM energy, the identifier of the received EM energy may be compared to copies of identifiers that were stored previously. This comparison may include comparing a set of bits that identify a set of transmitted EM energy with bits decoded as an identifier from a received set of EM energy. In this way, a sensing apparatus may generate encoded signals, transmit those encoded signals as sets of EM energy, receive reflected EM energy, and associate a particular set of transmitted EM energy with a specific set of received EM energy at high speed using predominantly electronic hardware (e.g. analog and/or digital) circuits.

In an instance, when the reflected EM energy is received after the second set of EM signals are transmitted and when the reflected EM energy includes an identifier that matches the identifier of the first set of transmitted EM signals, the sensing apparatus may identify that the received set of EM energy is associated with or corresponds to the first set of transmitted EM signals. This may allow the sensing apparatus to account for the receipt of the EM energy and this may result in that set of received EM energy being treated as an echo. In such an instance, data associated with an echo may be ignored or processed when other determinations are made. In another instance, the set of EM energy received in step 220 may be received before the transmission of the second or subsequent set of EM energy. After step 240 a location of the object may be identified in step 250 of FIG. 2. The location of the object may be identified by processing circuits that perform calculations. For example, a processor (digital signal processor, a conventional processor, and/or a graphics processing unit) may execute instructions to process data associated with the received sets of EM energy after a specific set of EM energy is associated with a transmitted set of EM energy. This processing may result in identifying the location of the object and/or a distance that the object is from the sensing apparatus.

The generation of identifiers included in the different sets of transmitted EM signals may be performed using various techniques that may include, yet are not limited to the use of a signal generator or the use of a random number generator.

Figure 3:
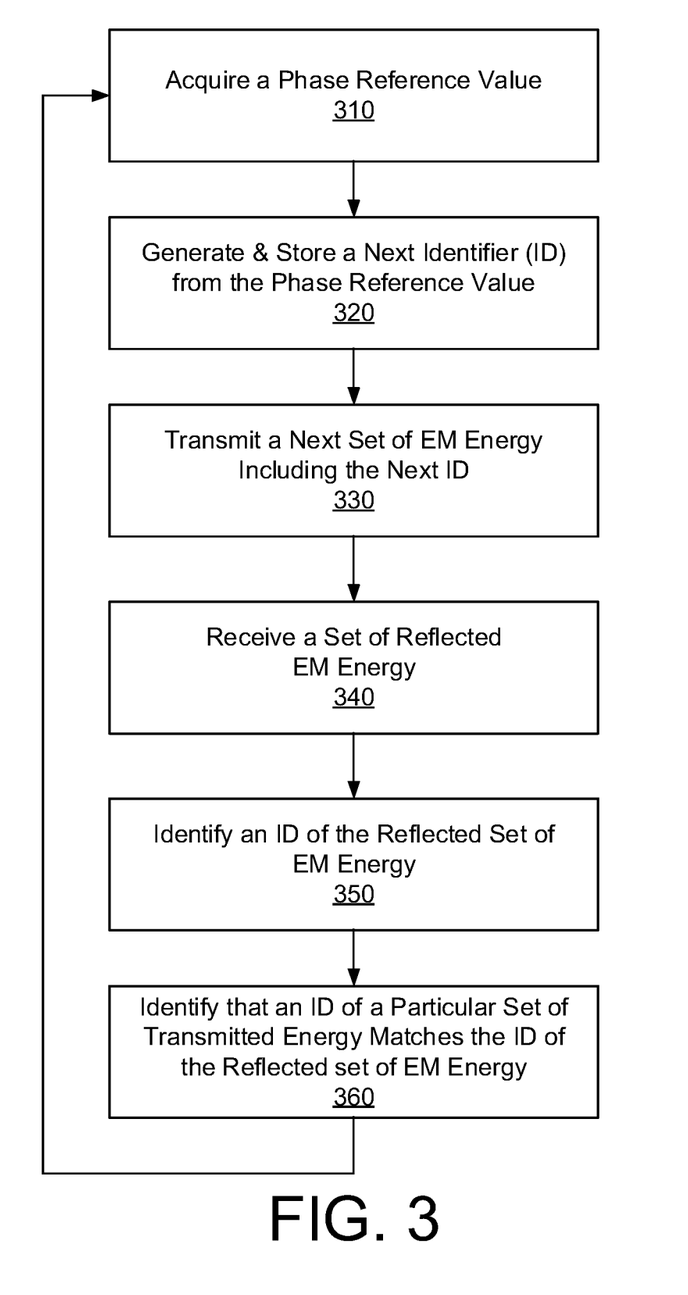
FIG. 3 includes a set of steps that may be used to generate the unique identifiers discussed above as well as the sets of transmitted EM pulses.

FIG. 3 includes a set of steps that may be used to generate the unique identifiers discussed above as well as the sets of transmitted EM pulses. In one instance, a phase reference value may be acquired from a signal generator that corresponds to the first identifier discussed above in respect to FIG. 2. Here the first and subsequent identifiers may be generated from a set of low correlated signals, which will result in a similiture (i.e., simulation) index with the phase of the previous signals. This low correlation feature can be generated by a chaotic reference signal generator. Chaotic signals are deterministic and information rich signals that are highly sensitive to the initial conditions of the model generating them, unlike noise that is probabilistic in nature.

In another instance, the generation of respective identifiers may be generated by a random number generator. Since the various EM signals discussed above travel at a very high speed and since the speed that a random number generator operates may be subject to other constraints, a given type of random number generator may or may not be capable of generating random numbers quickly enough. To overcome this limitation, a set of previously generated random numbers may be stored and accessed when an EM transmission is prepared for transmission from the sensing apparatus. These random numbers may be stored at a memory that may be a non-volatile memory (e.g. a FLASH memory) such that different random numbers may be retrieved at hardware speed. Such random numbers may be a recording of random data, for example, they may correspond to previously recorded sets of white noise or may have been generated by recording of noise generated by a mercury vapor arc lamp or other truly random noise source. Such sets of stored random numbers may be sufficiently large, that the sensing apparatus will not associate a same random number with a set of transmitted EM energy for a span of time. For example, if a same random number is not used over a time span of 30 seconds, all EM energy associated with a previous use of that same random number would be dissipated into the environment. In this way, a small set of random numbers may be reused as "unique identifiers" and from the perspective of the sensing apparatus, each of these random numbers would be unique.

No matter how identifiers are generated, these identifiers may correspond to a shifting of phase in a set of transmitted pulses of a burst of EM energy. These changes in phase may correspond to encoded data that may be similar in nature to signals used in data channels. For example, transmitted and received EM energy may encode data and decode data (e.g. the aforementioned identifiers) in a manner similar to a frequency modulated encoding, a modified frequency modulation (MFM) encoding or run length limited (RLL) encoding used in data channels. As such, the identifiers may be encoded in the form of a frequency or phase modulated signal. An example of such an encoded signal is illustrated in FIG. 6. Paragraphs of the present disclosure that review content of FIG. 6 are located later in this disclosure.

In order to synchronize with a received set of reflected EM energy, transmitted radar signals may include a preamble field that allows circuitry of a sensing apparatus to synchronize timing to the set of received EM signals. This synchronization process may rely on the preamble field including pulses of a same frequency. Here a phase locked loop may be used in conjunction with decoding hardware to separate an identifier of the reflected EM energy from a burst of the received EM energy. Changes in the phase or frequency of these signals may be used to encode an identifier into a signal and may be used to decode that identifier after a reflection of the signal is received by a sensing apparatus. This preamble field may be followed by a synchronization field that allows the sensing apparatus to identify a precise location to decode the identifier encoded into a received set of reflected EM energy.

In step 310 of FIG. 3, a phase reference value may be identified and this phase reference value may correspond to a unique identifier. A phase reference generator, such as the phase reference generator 505 of FIG. 5, may include circuitry that generates an identifier or that accesses identifiers. The phase reference value may be acquired by initiating operation of a random number generator, by accessing previously generated stored random numbers, or by accessing low correlated phase references generated by a chaotic reference signal reference generator as discussed in respect to FIG. 2. Next, in step 320 a next identifier (e.g. a first, a second, or a third identifier) may be generated and stored. In some instances, steps 310 and 320 may be a same step or include a single operation of acquiring an identifier. Once acquired or generated, the identifier may be stored in a register (e.g. a shift register) or other memory that may be accessed when a transmitted set of EM energy is associated with a received set of EM energy. After step 320, a next set of EM energy that includes a next identifier may be transmitted from the sensing apparatus in step 330. This may include transmitting an encoded signal from a radar antenna of the sensing apparatus or by transmitting the encoded signal from a LiDAR transmitting circuit as discussed in respect to FIG. 2.

A received set of reflected EM energy may be received in step 340. This reflected set of EM energy may be received by a radar antenna or by a receiving circuit of a LiDAR. Next, an identifier (ID) encoded into that reflected set of EM energy may be decoded in step 350 of FIG. 3. The decoding of the identifier may be performed in a manner consistent with the decoding of data discussed in respect to FIG. 2 or FIG. 6. Respective phase relationships of this received EM energy may correspond to a particular identifier of a previously transmitted set of EM pulses. A particular set of reflected EM energy received at an apparatus may be associated with a particular set of previously transmitted EM energy in step 360 of FIG. 3 based on an identifier included in the particular received set of EM energy matching an identifier of a particular transmitted set of EM energy. This match may be identified by comparing a set of bits that identify a set of transmitted EM energy with bits decoded as an identifier from a received set of EM energy. As discussed above, data (e.g. bits) that identify the identifier of a transmitted set of EM energy may be stored in a memory such as a register or shift register.

While not illustrated in FIG. 3, step 360 may include other actions, for example, identifying a location of an object, a distance that the object is from the sensing apparatus, and/or a velocity associated with the object. As discussed above in respect to FIG. 2, the location and/or the distance that the object is from the sensing apparatus may be identified by a processor that executes instructions out of a memory when calculations are performed. After step 360, operations performed by the method of FIG. 3 may be consistent with step 310 of FIG. 3 where another phase reference value is acquired.

In certain instances, methods of the present disclosure may include receiving pulses of a first set of electromagnetic energy at the sensing apparatus based on the pulses of the first burst of electromagnetic energy being reflected off of an object at a location. For example, the processor 410 of FIG. 4 may perform analysis on data associated with sets of pulses of a first set of electromagnetic energy that may have been received by circuits discussed in respect to FIG. 5.

Figure 4:
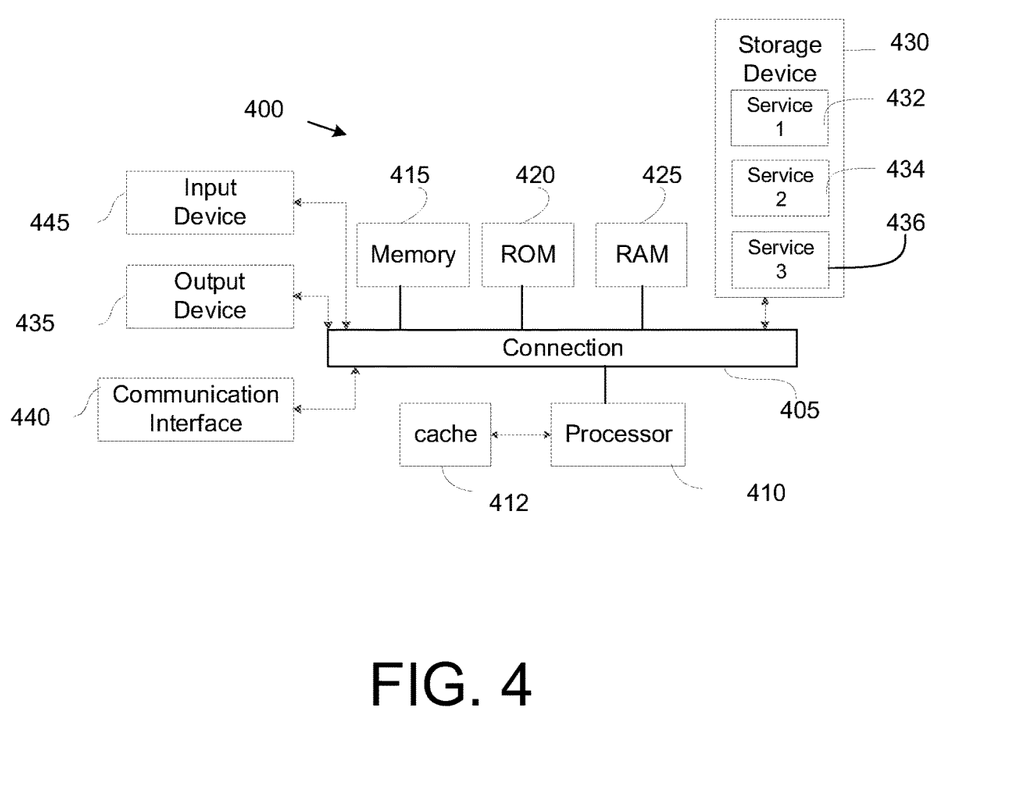
FIG. 4 shows an example of computing system 400 that may be used to implement at least some of the functions reviewed in the present disclosure.

FIG. 4 shows an example of computing system 400 that may be used to implement at least some of the functions reviewed in the present disclosure. In certain instances, a computing device may be incorporated into a sensing apparatus or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 442, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

Figure 5:
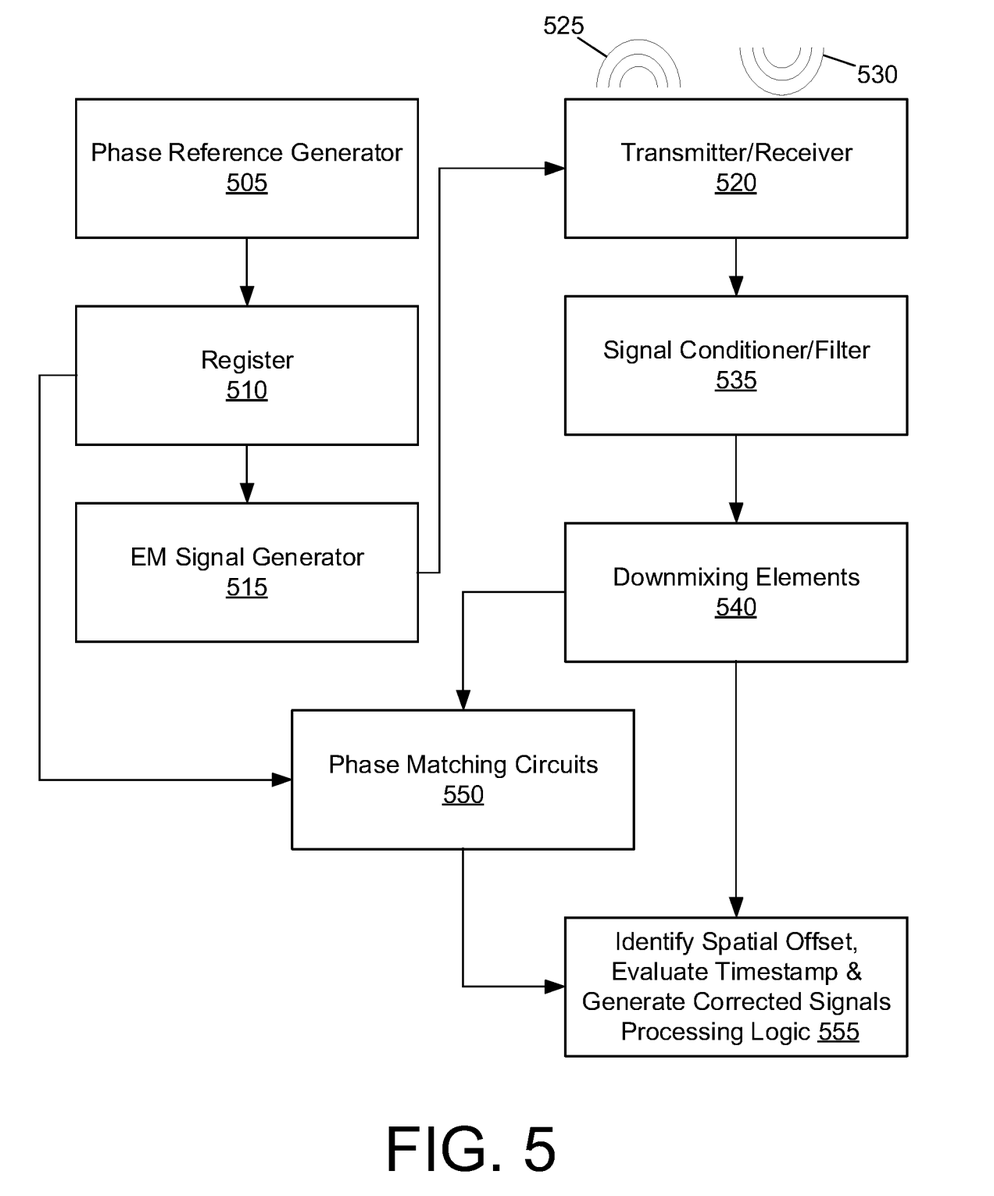
FIG. 5 illustrates elements that may be used to generate, condition, evaluate, process, and/or combine sets of received electromagnetic (EM) energy.

FIG. 5 illustrates elements that may be used to generate, condition, evaluate, process, and/or combine sets of received electromagnetic (EM) energy. FIG. 5 includes phase reference generator 505, register 510 (that may be a shift register), EM signal generator 515, transmitter/receiver 520, signal conditioner/filter 535, downmixing elements 540, matching circuits 515, and processing logic 555. Phase reference generator 505 may include circuitry that generates an identifier or accesses an identifier as discussed in respect to step 210 of FIG. 2 and step 310 of FIG. 3. After a value or identifier has been generated, it may be stored in register 510 and that identifier may be provided to circuitry 515 that generates an EM signal 525 that is transmitted by transmitter/receiver 520. Here again this EM signal may include a series of pulses that may include a high frequency signal and an encoded identifier. Here changes in phase of the EM signal may be used to encode the identifier into the pulses of EM energy that are transmitted.

EM signal generator 515 may be a circuit that generates waveforms that will be transmitted by transmitter/receiver 510. EM signal generator 515 may include a signal source (e.g. an oscillator or voltage controlled oscillator) that generates a signal at a particular carrier frequency when circuits of EM signal generator 515 encode an identifier into the carrier frequency. Phase changes identified by phase reference generator 505 once being loaded into register 510 may be used to modulate phases of the carrier frequency of the EM signal generator 515. A signal output from EM signal generator 515 that includes an encoded identifier may be provided to transmitter/receiver 520 such that transmitter receiver 520 may transmit EM signal 525. Here again, the transmitted EM signal 525 may include a set of pulses in a burst of EM energy, for example, at a frequencies consistent with a radar or LiDAR sensing apparatus. Transmitter/receiver 520 may include elements such as an antenna, emitter, receiver, or transceiver capable of transmitting and/or receiving EM signals of particular types (e.g. radar signals or LiDAR signals).

After EM signal 525 is transmitted from the transmitter/receiver 520 it may bounce off of an object and then be received as signal 530 by transmitter/receiver 520. The received signal may then be passed to a signal conditioner 535 that may be a filter that removes unwanted noise from received signal 530. After signal 530 is filtered, it may be provided to a set of downmixing elements 540. The downmixing elements 540 may include several elements that may be used to process several different FMCW signals. Phases of these FMCW signal cycles may be compared with information (the identifier) stored in the register 510. This may include comparing each bit of a shift register with information of different particular downmixing elements.

When the content of register 510 matches phase changes of a downmixing element, the sensing apparatus may identify whether a currently received signal corresponds to a most recent transmitted signal or a previously transmitted signal. This matching process may include comparing reference phases with each of a set of downmixing elements with content stored in a shift register. This matching process may also include sampling a downmixing stage, identifying a spatial offset, and comparing the spatial offset with a timestamp applied to previous sets of transmitted signals. This spatial offset may be identified from a phase index that yields an acceptable level of correlation or a correlation that meets a threshold level. This index provides the window at which the signal was originally radiated, and by multiplying this phase index by the signal period duration and twice the speed of light in the vacuum a spatial offset can be obtained This may allow sampled and spatially corrected signals to be passed to a backend processing logic 555 to identify a set a transmitted signal set that a received EM data is associated with.

Phase reference generator 505, register 510, EM signal generator 515, phase matching circuits 550, transmitter/receiver 520, signal conditioner 535, and downmixing elements 540 may all be implemented using sets of electronic or electrical hardware circuits. These hardware circuits may include digital logic, analog frequency generators (e.g. an oscillator or voltage-controlled oscillator), encoding circuits, amplifiers, or components that filter received signals. Processing logic 555 may also include electronic hardware and/or may include processors that perform functions of a sensing apparatus.

Identifying which set of received signals belongs to a particular set of transmitted EM energy allows the sensing apparatus to operate at frequencies that otherwise could cause the sensing apparatus to miss-identify a location of an object or to perceive fantom objects as real objects. By processing data associated with a signal (e.g. doppler phase shift) with a known set of actual timing allows the sensing apparatus to interpret received signals more accurately. The identifiers encoded in a transmitted signal allows the apparatus it identify a time that a signal was transmitted and to identify a time when the reflection of that signal was received. From this information the apparatus can identify an elapsed time. This elapsed time information combined with a doppler phase shift may allow the sensing apparatus to more accurately identify relative distances and velocities associated with relative motion of a vehicle and an object. Other characteristics of an object may also be identified. For example, reflections off of different parts of an object may allow the sensing apparatus to identify whether relative motion is associated with rotation.

A velocity and/or distance to associate with the object may be identified based on the processing of pulses of the set of electromagnetic energy in association with a transmission time of the pulses. For example, a sensing apparatus may identify a velocity to associate with the object based on the processing of the pulses of a received set of electromagnetic energy in association with pulses of a first burst of transmitted electromagnetic energy.

Multiple sets of EM pulses, each with a different identifier may be transmitted, reflections of those transmitted signals may be received, and those signals may be processed as discussed above. These sets of EM pulses may include a first set of pulses, a second set of pulses, and a third set of pulses, each of which are associated with a different transmission time and a different identifier. Each identifier may be associated with a unique set of phase changes that are used to encode an identifier into a transmitted signal set. Each respective set of transmitted signals may be referred to as a burst that includes pulses of EM energy.

FIG. 6 illustrates a first waveform that includes encoded data, a second waveform that may act as a clock to decode data included in the first waveform, and data that has been decoded from the first waveform. The left side of first waveform 610 of FIG. 6 includes set of regularly spaced pulses of a particular frequency during a phase lock period followed by pulses that have different phase relationships than the regularly spaced pulses. When the pluses of waveform 610 are provided to a phase locked loop (PLL), those pulses may be used to synchronize the timing of an oscillator at the PLL and this may result in the clock waveform 620 being generated with the timing illustrated in FIG. 6. Note that after the phase lock period, data bits of (1, 1, 1, 0, 1, 0, 1, 0, 0, 0, 1, 1, 1, 1) are decoded from waveform 610. The logic values of one or zero are decoded from the waveform 610 on the rising edge of clock waveform 620, when the clock transitions from a low to a high value, a state of waveform 610 is sampled. Here a one state corresponds to a high value of waveform 610 and a zero state corresponds to a low value of waveform 610 as indicated by the arrows of FIG. 6.

A data pattern of 1, 1, 1, and 0 may correspond to a synchronization pattern and the remaining bits of 1, 0, 1, 0, 0, 0, 1, 1, 1, and 1 may correspond to an identifier associated with a particular set of transmitted EM pulses. The synchronization patter may be used to identify a precise location of where an identifier is located in a signal. Note that the presence or absence of pulses in waveform 610 as compared to clock waveform 620 correspond to changes in phase of signal 610. Because of this, FIG. 6 illustrates how data may be encoded into a waveform using changes in phase of a signal.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for interpreting signals, the method comprising:
    transmitting pulses of a first burst of electromagnetic energy from a sensing apparatus, the pulses of the first burst of electromagnetic energy including a first identifier encoded into and associated with the pulses of the first burst of electromagnetic energy;
    receiving pulses of a first set of electromagnetic energy at the sensing apparatus based on the pulses of the first burst of electromagnetic energy being reflected off of an object at a location;
    preprocessing the first set of electromagnetic energy by:
        providing the first set of electromagnetic energy to a downmixing element that is associated with a reference phase; and
        identifying that the reference phase of the downmixing element corresponds to a phase reference value that corresponds to the first identifier;
    acquiring an output from the downmixing element; and applying a spatial offset to a timestamp associated with the pulses of the first burst of electromagnetic energy;

identifying that the pulses of the first set of electromagnetic energy are associated with the pulses of the first burst of electromagnetic energy based on the pulses of the first set of electromagnetic energy including the encoded first identifier, wherein the identifying that the pulses of the first set of electromagnetic energy are associated with the first burst of electromagnetic energy is based on applying the spatial offset to the timestamp; and processing the pulses of the first set of electromagnetic energy in association with the pulses of the first burst of transmitted electromagnetic energy to identify the location of the object.

2. The method of claim 1, further comprising:
acquiring, from a signal generator, the phase reference value that corresponds to the first identifier;
storing the phase reference value; and
generating the pulses of the first burst of electromagnetic energy for transmission.

3. The method of claim 2, further comprising, transmitting pulses of a second burst of electromagnetic energy including a second identifier encoded into and associated with the pulses of the second burst of electromagnetic energy.

4. The method of claim 1, generating the first identifier from a set of low correlated phase references.

5. The method of claim 1, generating the first identifier by a random number generator.

6. The method of claim 1, further comprising identifying a characteristic of the object.

7. The method of claim 6, wherein the characteristic corresponds to movement of the object relative to the sensing apparatus.

8. The method of claim 1, further comprising generating the first burst of electromagnetic energy such that the first burst of electromagnetic energy includes a preamble field followed by the encoded first identifier.

9. The method of claim 8, wherein the first burst of electromagnetic energy also includes a synchronization field located between the preamble field and the encoded first identifier.

10. The method of claim 1, wherein the first burst of electromagnetic energy includes a signal that has a frequency associated with operation of the sensing apparatus.

11. The method of claim 10, wherein the signal is a frequency modulated signal.

12. The method of claim 1, further comprising identifying a distance to associate with the object based on the processing of the pulses of the set of electromagnetic energy in association with the pulses of the first burst of transmitted electromagnetic energy.

13. The method of claim 1, further comprising identifying a velocity to associate with the object based on the processing of the pulses of the set of electromagnetic energy in association with the pulses of the first burst of transmitted electromagnetic energy.

14. The method of claim 1, further comprising identifying a distance and a velocity to associate with the object based on the processing of the pulses of the set of electromagnetic energy in association with the pulses of the first burst of transmitted electromagnetic energy.

15. The method of claim 1, further comprising:
transmitting pulses of a second burst of electromagnetic energy including a second identifier encoded into and associated with the pulses of the second burst of electromagnetic energy; and transmitting pulses of a third burst of electromagnetic energy including a third identifier encoded into and associated with the pulses of the third burst of electromagnetic energy.

16. The method of claim 15, further comprising:
receiving pulses of a second set of electromagnetic energy at the sensing apparatus;
identifying that the pulses of the second set of electromagnetic energy are associated with the pulses of the second burst of transmitted electromagnetic energy based on the pulses of the second set of electromagnetic energy including the encoded second identifier, wherein the receipt of the pulses of the second set of electromagnetic energy are based on the pulses of the second burst of transmitted electromagnetic energy being reflected off of the object; and
processing the second set of electromagnetic energy in association with the pulses of the second burst of transmitted electromagnetic energy based on the identification that pulses of the second set of electromagnetic energy include the encoded second identifier after the pulses of the second burst of transmitted electromagnetic energy are reflected off of the object.

17. The method of claim 16, wherein the pulses of the first set of electromagnetic energy are received after the transmission of the pulses of the second burst of electromagnetic energy and the pulses of the second set of electromagnetic energy are received after transmission of the pulses of the third burst of electromagnetic energy.

18. An apparatus for interpreting signals, the apparatus comprising:
a transmitting element that transmits pulses of a first burst of electromagnetic energy from a sensing apparatus, the pulses of the first burst of electromagnetic energy including a first identifier encoded into and associated with the pulses of the first burst of electromagnetic energy;
a receiving element that receives pulses of a first set of electromagnetic energy at the sensing apparatus based on the pulses of the first burst of electromagnetic energy being reflected off of an object at a location;
electronic circuits that preprocess the first set of electromagnetic energy by:
providing the first set of electromagnetic energy to a downmixing element that is associated with a reference phase; and
identifying that the reference phase of the downmixing element corresponds to a phase reference value that corresponds to the first identifier;
acquiring an output from the downmixing element; and
applying a spatial offset to a timestamp associated with the pulses of the first burst of electromagnetic energy,
wherein the electronic circuits identify that that the pulses of the first set of electromagnetic energy are associated with the pulses of the first burst of electromagnetic energy based on the pulses of the first set of electromagnetic energy including the encoded first identifier, wherein the electronic circuits identify that the pulses of the first set of electromagnetic energy are associated with the first burst of electromagnetic energy based on applying the spatial offset to the timestamp;
a memory; and a processor that executes instructions out of a memory to identify the location of the object.

19. A non-transitory computer-readable storage medium having embodied thereon a program executable by a processor to perform a method for interpreting signals, the method comprising: controlling transmission of pulses of a first burst of electromagnetic energy from a transmitting element, the pulses of the first burst of electromagnetic energy including a first identifier encoded into and associated with the pulses of the first burst of electromagnetic energy, wherein:

pulses of a first set of electromagnetic energy are received at a receiving element based on the pulses of the first burst of electromagnetic energy being reflected off of an object at a location, the method further comprises preprocessing the first set of electromagnetic energy by:

providing the first set of electromagnetic energy to a downmixing element that is associated with a reference phase; and identifying that the reference phase of the downmixing element corresponds to a phase reference value that corresponds to the first identifier;

acquiring an output from the downmixing element; and applying a spatial offset to a timestamp associated with the pulses of the first burst of electromagnetic energy; and an identification is performed indicating that the pulses of the first set of electromagnetic energy are associated with the pulses of the first burst of electromagnetic energy based on the pulses of the first set of electromagnetic energy including the encoded first identifier, wherein the identification indicating that the pulses of the first set of electromagnetic energy are associated with the first burst of electromagnetic energy is based on the applying of the spatial offset to the timestamp; and processing data associated with the first set of electromagnetic energy in association with the pulses of the first burst of transmitted electromagnetic energy to identify the location of the object.

* * * * *